United States Patent [19]

Garkawe

[11] Patent Number: 5,366,255
[45] Date of Patent: Nov. 22, 1994

[54] EXPANSION SEAL ASSEMBLY

[75] Inventor: Michael Garkawe, Madison, N.J.

[73] Assignee: Foster Wheeler Energy Corporation, Clinton, N.J.

[21] Appl. No.: 187,375

[22] Filed: Jan. 27, 1994

Related U.S. Application Data

[63] Continuation of Ser. No. 844,023, Mar. 2, 1992, abandoned.

[51] Int. Cl.$^5$ .................... F16L 53/00; F16L 27/00
[52] U.S. Cl. .................... 285/41; 285/47/299
[58] Field of Search .................... 285/41, 49, 55, 47, 285/224, 229, 299, 300, 301; 55/269; 122/40, 6

[56] References Cited

U.S. PATENT DOCUMENTS

| | | | |
|---|---|---|---|
| 2,826,403 | 3/1958 | Moklebust | 285/41 |
| 2,937,036 | 5/1960 | Watkins | 285/41 |
| 3,460,856 | 8/1969 | Van Tine et al. | 285/300 |
| 3,891,396 | 6/1975 | Musall et al. | 285/300 |
| 3,997,194 | 12/1976 | Eifer et al. | 285/300 |
| 4,273,365 | 6/1981 | Hagar | 285/229 |
| 4,461,608 | 2/1984 | Waryasz | 172/510 |
| 4,576,404 | 3/1986 | Weber | 285/41 |
| 4,685,703 | 8/1987 | Brock | 285/299 |
| 4,712,938 | 12/1987 | Seshamani et al. | 285/224 |
| 4,848,803 | 7/1989 | Bachmann | . |
| 5,094,191 | 3/1992 | Garkawe et al. | . |
| 5,116,394 | 5/1992 | Garkawa | 55/269 |
| 5,145,215 | 9/1992 | Udell | 285/300 |

FOREIGN PATENT DOCUMENTS

| | | | |
|---|---|---|---|
| 2284081 | 4/1976 | France | . |
| 1248060 | 11/1964 | Germany | . |
| 2410341 | 9/1975 | Germany | 285/41 |
| 1477262 | 6/1977 | United Kingdom | . |
| 2052665 | 1/1981 | United Kingdom | 285/224 |

Primary Examiner—Eric K. Nicholson
Attorney, Agent, or Firm—Marvin A. Naigur

[57] ABSTRACT

An expansion seal assembly for sealingly connecting first and second conduits which experience relative thermal expansion and contraction due to the flow of hot material through the conduits. The conduits each comprise a plurality of hollow tubes integral therewith, a portion of the second conduit telescopically overlapping a portion of the first conduit in a spaced relationship to permit the relative axial and lateral movements of the conduits. A fluid circulatory system is provided for passing a heat transfer fluid through the tubes to remove heat from the material passing within the conduits. First and second corrugated plates extend outwardly from the first and second conduits, respectively and are sealed with a composite fabric belt dimensioned to permit the relative movements. Alternatively, a first plate extends outwardly from the second conduit and the second plate is rigidly secured to and extends between the first conduit and the first plate having corrugations to permit the relative movements. Finally, thermal insulation is disposed between the plates exterior to the conduits to inhibit heat flow.

20 Claims, 3 Drawing Sheets

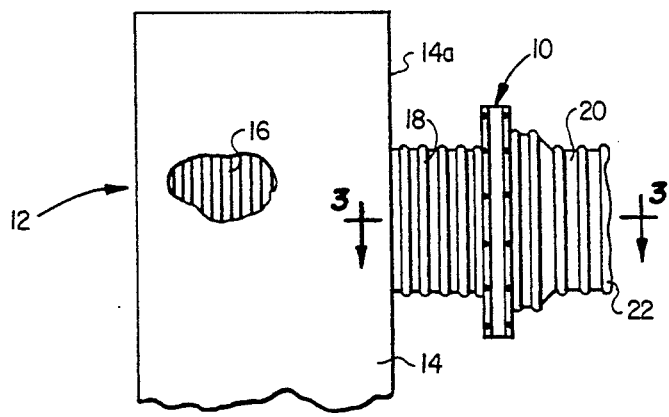
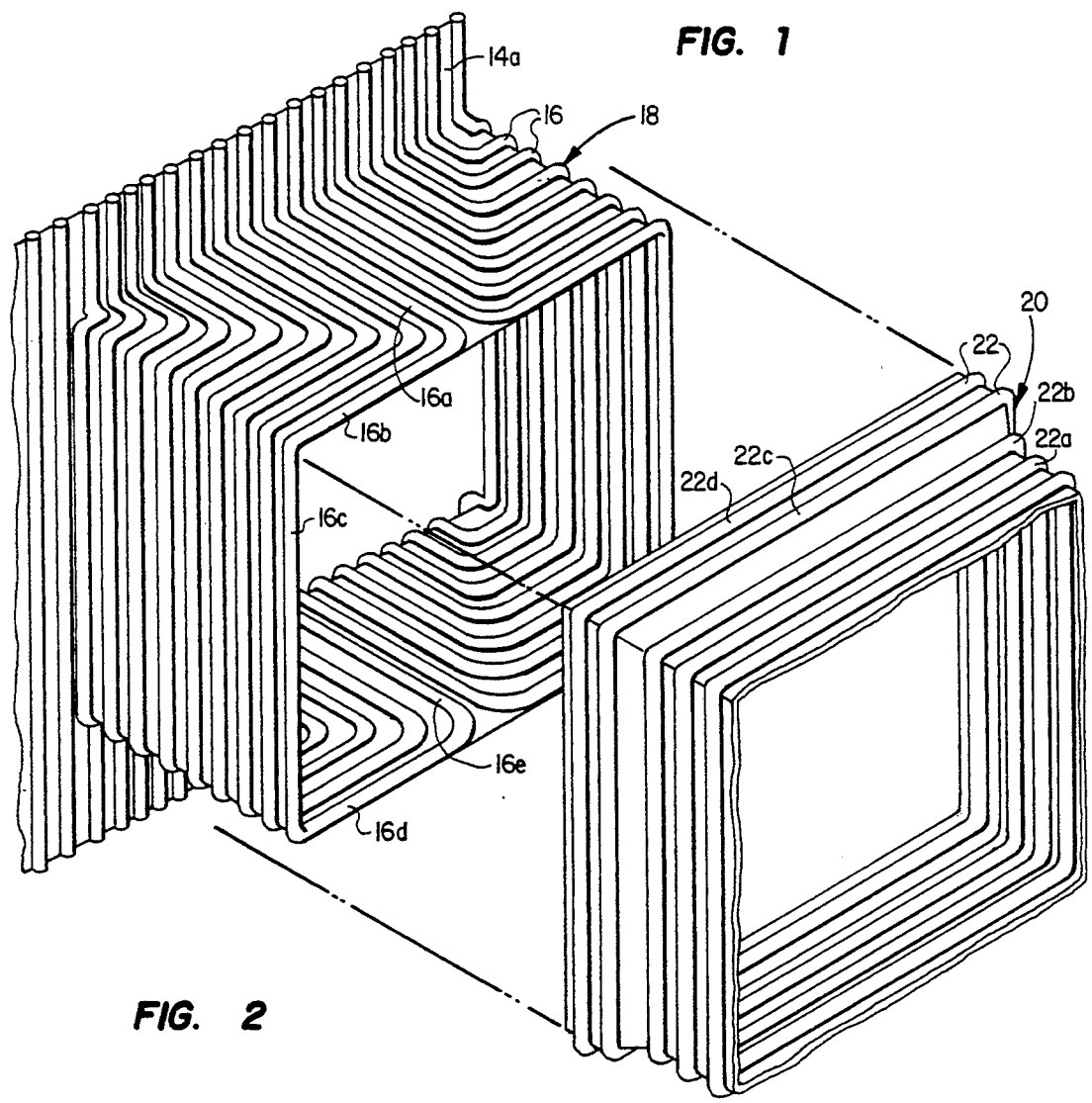
FIG. 1
FIG. 2

EXPANSION SEAL ASSEMBLY

This is a continuation of co-pending application Ser. No. 07/844,023 filed on Mar. 2, 1992, now abandoned.

BACKGROUND OF THE INVENTION

This invention relates to expansion seal assemblies and, more particularly, to such an assembly for sealingly connecting components of fluidized bed reactors passing high temperature combustion gases and particulate material.

Reactors, such as combustors, steam generators and the like, utilizing fluidized beds as their primary source of heat generation, are well known. In these arrangements, air is passed into the furnace section of the reactor and through a bed of particulate material contained therein which includes a mixture of a fossil fuel, such as coal, and an adsorbent, such as limestone, which is used to adsorb the sulfur generated as a result of combustion of the coal. The air fluidizes the bed and promotes the combustion of the fuel. The hot combustion gases are passed to a heat recovery area where their heat is removed to perform work, such as to drive a steam turbine.

The most typical fluidized bed combustion system is commonly referred to as a "bubbling" fluidized bed in which a dense bed of the particulate material is supported by an air distribution plate to which the combustion supporting air is introduced through a plurality of perforations, causing the particulate material to expand and take on a suspended, or fluidized, state.

In an effort to extend the improvements in combustion efficiency, pollutant emissions control, and operation turn-down afforded by the bubbling bed, a fluidized bed reactor was developed utilizing an expanded and elutriating fluidized bed commonly referred to as a "circulating" fluidized bed. In these arrangements, the size of the particulate material is decreased and/or the mean air velocity is increased when compared to the bubbling bed, so that the bed surface becomes more diffused and the entrainment of particulate material from the bed is increased. According to this process, in the lower portion of the furnace section, fluidized bed densities are attained which are well below those typical of bubbling fluidized beds, whereas the upper portion of the furnace section becomes loaded with entrained particulate material, or solids, to a much greater extent than in bubbling fluidized beds. This increased solids entrainment in the upper portion of the furnace section results in a high solids throughput which requires a high solids recycle rate. Reactors having high solids recycle rates require separators to separate the entrained particulate material from the hot combustion gases before the gases pass through the heat recovery area in order to reduce erosion of the heat recovery surfaces in the heat recovery area.

U.S. Pat. Nos. 4,809,623 and 4,809,625, assigned to the same assignee as the present application, disclose a fluidized bed reactor in which a dense, or bubbling, fluidized bed is maintained in the lower portion of the furnace section, while the bed is otherwise operated as a circulating fluidized bed. The design is such that advantages of both a bubbling bed and a circulating bed are obtained, not the least significant advantage being the ability to utilize particulate fuel material extending over a greater range of particulate sizes.

In these arrangements, passages are formed between the steam generating system components for allowing the combustion gases and particulate material to flow from one component to the next. These passages are embodied in conduits interconnecting the system components, or, when the distance between adjoining components is short, in the integrally connected walls which form the component outlets and inlets. These connections are complex structures since, in normal operation, the materials being passed between the various components of a steam generating system can have temperatures in excess of 2000° F. and pressures either below or above atmospheric.

Due to the extreme temperatures involved, the seals forming the connections between the steam generating system components and/or conduits must accommodate relative thermal expansion and contraction between the connected structures, especially when the components are anchored to the structural steel supporting the system. Such seals are relatively expensive since the relative expansion and contraction occurs in two lateral directions as well as in the axial direction.

Known seal designs are subject to failure due to erosion and thermal degradation caused by the impingement of the heated particulate material passing through the passages. The cost of replacing failed seal assemblies and the accompanying lost operating time is great.

The design of seal assemblies is further complicated due to the pressure differentials that can exist between the flow within the steam generating system and the outer atmosphere. The seal must be designed to prevent air infiltration when the steam generating system is operated under suction but must also be designed to prevent gas leakage when the system is run at pressures above atmospheric.

SUMMARY OF THE INVENTION

It is therefore an object of the present invention to provide an improved expansion seal assembly which can be used to connect components of a fluidized bed reactor.

It is a further object of the present invention to provide an expansion seal assembly of the above type in which the interior surface of the seal is covered with a refractory material to provide insulation and prevent erosion and thermal degradation.

It is a still further object of the present invention to provide an expansion seal assembly of the above type in which the walls of the structures being joined are formed by a plurality of tubes interconnected by elongated bars, or fins, to form a contiguous, gas-tight structure through which a heat exchange fluid flows to cool the assembly.

It is a still further object of the present invention to provide an expansion seal assembly of the above type in which movement in the axial direction and both lateral directions, including thermal expansion, can be accommodated.

It is a still further object of the present invention to provide an expansion seal assembly of the above type which is air-tight.

It is a still further object of the present invention to provide an expansion seal assembly of the above type which can maintain temperatures of over 2000° F.

It is a still further object of the present invention to provide an expansion seal assembly of the above type in which excessive conduction heat losses through the assembly are avoided.

Toward the fulfillment of these and other objects, the conduits and component inlet and outlet walls (collectively, the "conduits") to be connected by the expansion seal assembly and method of the present invention are formed by a plurality of spaced, parallel, hollow tubes interconnected by elongated bars, or fins, to form a contiguous, gas-tight structure. The conduits are dimensioned so that one has a greater perimeter and cross-sectional area than the other, thereby allowing them to be telescopically joined in a spaced-apart relationship which permits movement between the conduits in the axial direction and both lateral directions. Flow circuitry is provided to pass a heat transfer fluid through the tubes to remove heat from the material passing through the conduits.

The conduits are sealingly joined together by expandable closure plates, and in one embodiment, a composite fabric belt. These plates and the belt are insulated from the heat of the materials passing through the conduits by thermal insulating materials including a ceramic blanket strip. Additional layers of thermal insulating materials are also employed in connection with the embodiment employing the fabric belt.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings in which:

FIG. 1 is a schematic view depicting the expansion seal assembly of the present invention;

FIG. 2 is an enlarged perspective view of the components to be joined by the assembly of FIG. 1;

DESCRIPTION OF THE PREFERRED EMBODIMENTS

Figure 3:
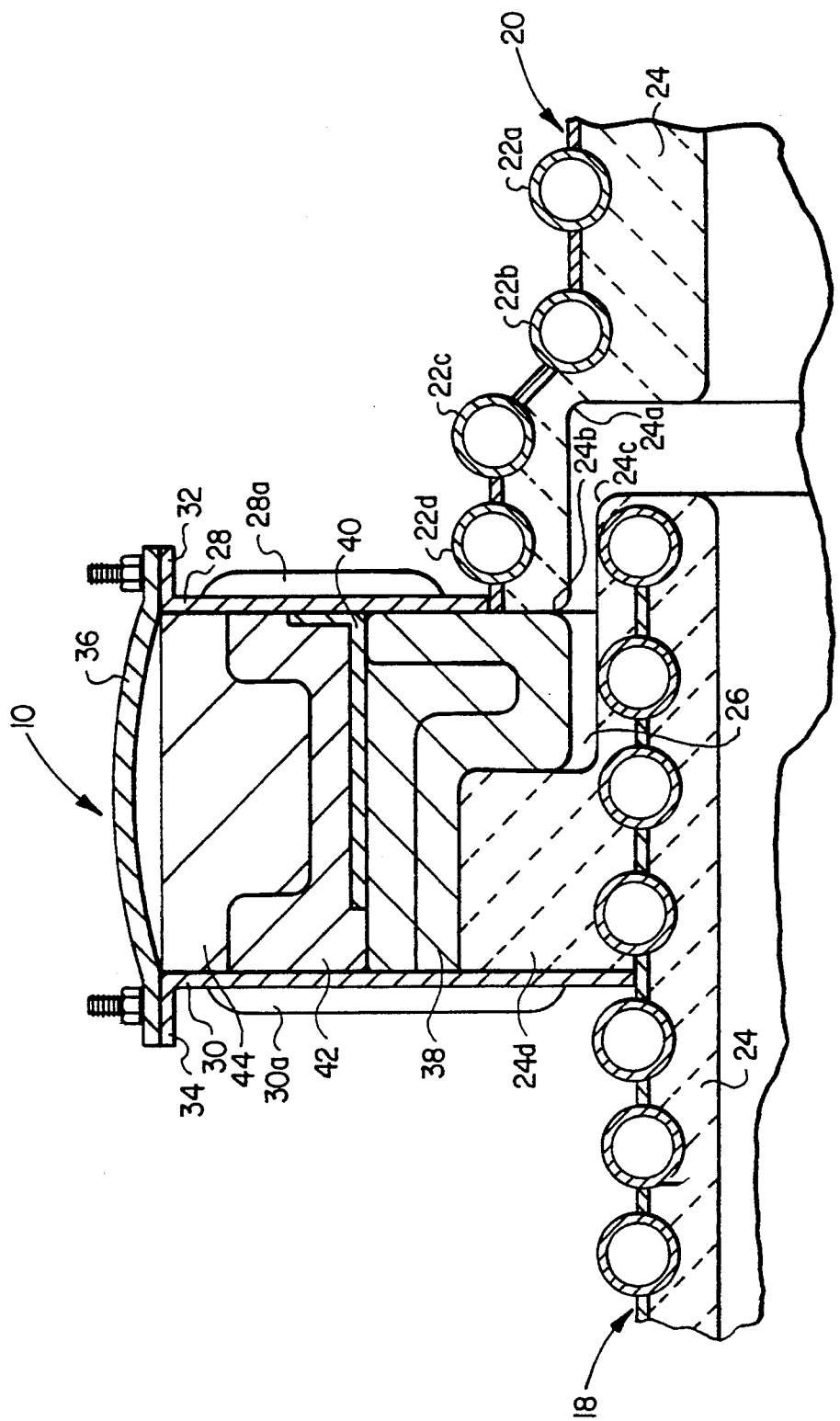
FIG. 3 is an enlarged, partial sectional view taken along the line 3—3 of FIG. 1.

Referring to FIG. 1 of the drawings, the reference numeral 10 refers in general to the expansion seal assembly of the present invention which is designed to sealingly connect components of a steam generating system 12. The system 12 includes a furnace 14 for the combustion of fuel, the walls of the furnace 14, including a wall 14a, being formed in a conventional manner by a plurality of spaced, parallel, hollow tubes 16 interconnected by elongated bars, or fins, to form a contiguous, gas-tight structure.

A rectangular combustion gas outlet 18 is formed in the furnace wall 14a for permitting the mixture of combustion flue gases and entrained particulate material produced in the furnace 14 to pass into the downstream components of the system 12 such as a separator or heat recovery area (not shown). As shown in FIG. 2, the outlet 18 is formed in a conventional manner by bending a portion of the tubes 16 which comprise the wall 14a at ninety degree angles. The bending is such that the portion of the tubes 16 forming the outlet 18 are all first bent away from the wall 14a, as shown for example by the reference numeral 16a. Each of the tubes 16 is then bent outwardly away from the centerline of the outlet 18, as shown by the reference numeral 16b, followed by a downward bend to form the sides of the outlet as shown by the reference numeral 16c. The bending process is then reversed, as shown by the reference numerals 16d and 16e, to complete the outlet 18. For a more detailed description of the formation of the outlet 18, see the description of combustion gas outlets in U.S. Pat. No. 5,094,191, assigned to the same assignee as the present application, which description is hereby incorporated by reference.

Attached to the outlet 18 is a conduit 20, a separator gas inlet, or other steam generating system component, which receives the mixture of combustion gases and entrained particulate material from the outlet 18. As shown in FIG. 2, the conduit 20 is formed by a plurality of spaced, parallel, hollow tubes 22, each bent into a rectangular frame and interconnected by elongated bars, or fins, like the tubes 16, it being understood that the conduit 20 could instead be formed in a like manner to the outlet 18. The tubes 22 located nearest the outlet 18 are referenced by the reference numerals 22a-22d, respectively, with the dimensions of the rectangular frame formed by the tubes 22a and 22b being similar to both the dimensions of the remainder of the conduit 20 and of the outlet 18. The tubes 22c and 22d form a rectangular frame having a greater perimeter and cross-sectional area than those formed by the tubes 22a and 22b to allow the conduit 20, as is shown in FIG. 3, to telescopically receive the outlet 18. Due to the telescoping nature of the conduit 20 around the outlet 18, tube 22d overlaps the tubes 16 forming the outlet 18 in a spaced apart relationship which permits relative movement between the conduit 20 and the outlet in the axial direction and both lateral directions.

Since all four sides of the connection between the outlet 18 and the conduit 20 are structurally identical to the side shown in FIG. 3, only that side will be described in detail.

Due to the extreme temperature of the combustion gases and entrained particulate material and the need to protect the tubes 16 and 22 from erosion, a refractory insulating material 24 lines the inner surfaces of the furnace 14, the outlet 18 and the conduit 20 and a portion of the outer surface of the outlet 18. As shown in FIG. 3, the refractory material 24 lining the inner surface of the conduit 20 is shaped to create a recessed shoulder 24a and terminates at the end of the conduit as a flat surface 24b. The refractory material 24 lining the outer surface of the outlet 18 is shaped to create a shoulder 24c and defines a protuberance 24d. A cavity 26 is defined between the surface 24b and the protuberance 24d for receiving thermal insulating materials as discussed below.

Connecting the conduit 20 to the outlet 18 is the expansion seal assembly 10 of the present invention. The assembly 10 is bounded by parallel closure plates 28 and 30 having corrugations 28a and 30a, respectively, to allow for expansion. The plate 28 extends outwardly from the end of the conduit 20 in the plane of the surface 24b and terminates with a flange 32. The plate 30 extends outwardly from the outlet 18 parallel to the plate 28, terminating with a flange 34 which extends in the same plane as the flange 32. The plates 28 and 30 are corrugated so as to absorb the temperature difference between the tubes 16 and 22 and the cooler exterior structures.

A composite fabric belt 36 caps the assembly 10 and is bolted along its side margins to the flanges 32 and 34. The width of the belt 36 between its bolted margins is such that expansion of the assembly 10 is permitted. The belt 36 should be of a material such as Microflex MF which can withstand temperatures of 1600° F. at pressures of 2 psi.

The assembly 10 is effectively insulated by four levels of thermal insulating materials which fill the space between the plates 28 and 30 including a ceramic blanket strip 38 that fills the lower lengthwise portion of the space between the plates 28 and 30. The blanket 38 is lodged partway into the cavity 26 to prevent ash from collecting in the assembly 10. A metallic shield 40 which runs across the top surface of the blanket 38 is welded to the plate 28 and extends perpendicularly from the plate 28 toward the plate 30 to prevent potential local hot spots from burning through the thermal insulating materials and damaging the belt 36. A U-shaped pillow 42 formed from an insulating ceramic blanket confined in a high temperature ceramic fiber glass cloth fills the lengthwise portion of the space between the plates 28 and 30 immediately above the shield 40. The pillow 42 further reduces the temperature at the belt 36. Filing the remaining space between the plates 28 and 30 is soft packing 44. The packing 44 is formed of 1" thick 2300° F. ceramic blanket strips. The assembly 10 is completed by bolting the side margins of the belt 36 to the flanges 32 and 34.

The blanket 38, the pillow 42 and the packing 44 are all composed of nonrigid materials which compress under pressure exerted by the plates 28 and 30 but also expand to prevent gaps from forming between themselves and the plates. In this manner, regardless of relative movement between the outlet 18 and the conduit 20, these thermal insulating materials ensure that heat released from the material flowing through the outlet 18 and the conduit 20 is effectively sealed. If a gap should happen to form between the blanket 38 and the plate 28, its path would be blocked by the shield 40.

Flow circuitry (not shown) is provided to pass a heat transfer fluid through the tubes 16 and 22 to heat the fluid by removing heat from the combustion gases and entrained particulate material passing through the outlet 18 to the conduit 20, which heat can be used to perform work, such as, for example, driving a steam turbine.

It is thus seen that the assembly 10 of the present invention provides several advantages. In general, the assembly 10 provides an effective seal between components of a fluidized bed reactor operating at relatively high temperatures. Specifically, due to the flexibility of the belt 36 and the compressibility of the thermal insulating materials, the assembly 10 can accommodate relative thermal expansion and contraction between the connected components, including movement in axial and both lateral directions. This is accomplished while the overall seal arrangement is maintained in a stable configuration due to the expanding and contracting nature of the thermal insulating materials. By forming the walls of the conduits to be connected out of tubes, the temperature experienced at the seal can be reduced by passing fluid through the tubes to absorb the heat of the material flowing through the passages. By removing this heat, the design of the assembly can be simplified over more costly arrangements. Overlapping the tubes to provide a continuous fluid-cooled surface, increases this effect. Further, since the overlapping tubes are coated with a refractory material, the highest temperature experienced at the seal is lowered still and the assembly is protected from erosion.

Figure 4:
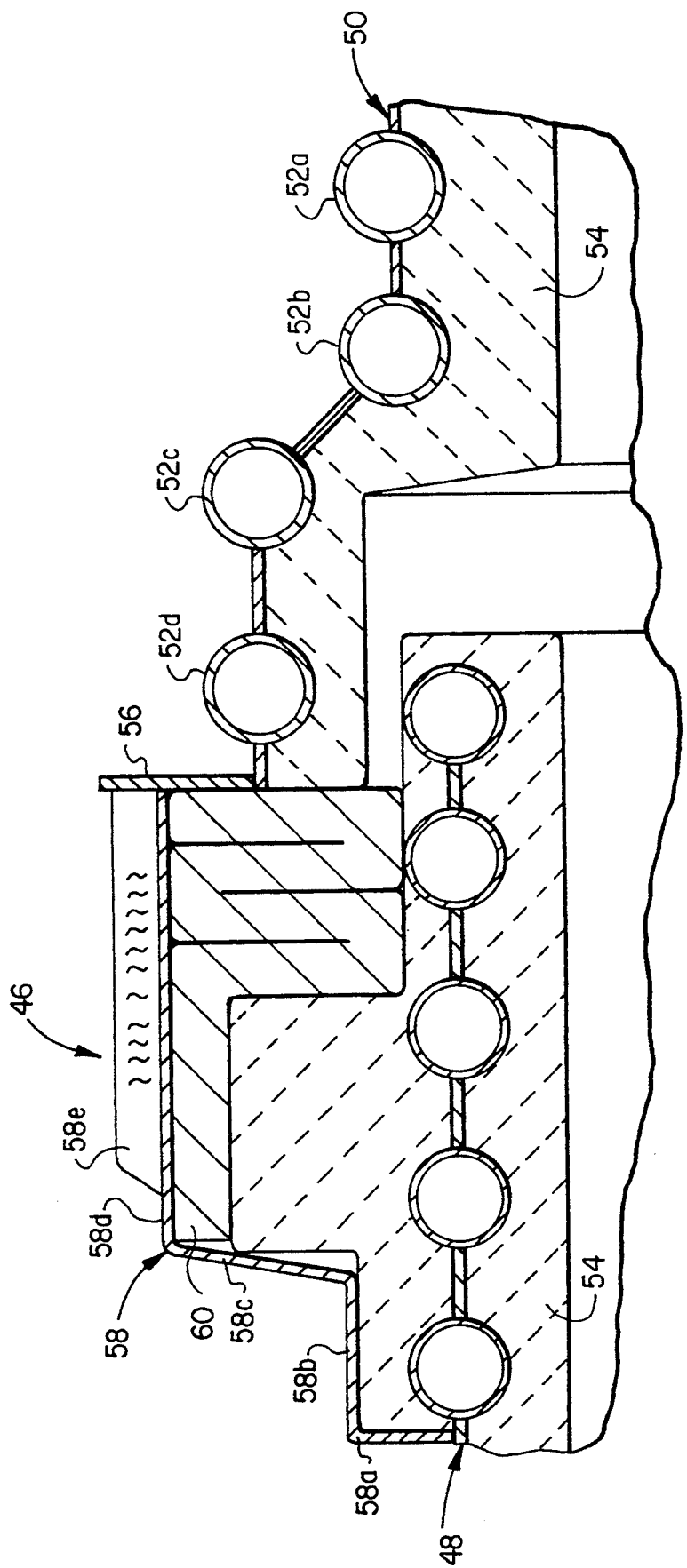
FIG. 4 is an enlarged, partial sectional view similar to FIG. 3 depicting an alternative preferred embodiment of the present invention.

An alternative preferred embodiment of the expansion seal assembly of the present invention is shown in FIG. 4 and is referred to in general by the reference numeral 46. An outlet 48 and a conduit 50 are provided and are identical as their corresponding parts in the previous embodiment. The outlet 48 is again formed by tubes as is the conduit 50. The tubes forming the end of the conduit 50 are referenced by the reference numerals 52a-52d, with the dimensions of the rectangular frame formed by the tubes 52a and 52b being similar to both the dimensions of the remainder of the conduit 50 and of the outlet 48. The tubes 52c and 52d form a rectangular frame having a greater perimeter and cross-sectional area than those formed by the tubes 52a and 52b to allow the conduit 50 to telescopically receive the outlet 48. Due to the telescoping nature of the conduit 50 around the outlet 48, tube 52d overlaps the tubes forming the outlet 48 in a spaced apart relationship which permits relative movement between the conduit 50 and the outlet 48 in the axial direction and both lateral directions.

The refractory insulating material 54 lining the surfaces of the outlet 48 and the conduit 50 form surfaces similar to those of the previous embodiment to form gaps to allow for expansion and for proper installation of the thermal insulating material discussed below.

Connecting the conduit 50 to the outlet 48 is the expansion seal assembly 46 of the present invention. The assembly 46 is bounded by a corrugated closure plate 56 which extends outwardly from the end of the conduit 50 and is welded to a second corrugated closure plate 58. The plate 58 is formed by a first vertical segment 58a integrally connected, and extending upwardly from, the outlet 48, a first horizontal segment 58b extending toward the conduit 50, an outwardly sloping segment 58c extending upwardly from the first horizontal segment, and a second horizontal segment 58d having corrugations 58e, the distal end of which is welded to the plate 56.

The assembly 46 is effectively insulated by a nonrigid ceramic blanket strip 60 which fills the space between the refractory material 54 and the plates 56 and 58 and compresses when put under pressure. The blanket 60 also prevents ash from collecting in the assembly.

Flow circuitry (not shown) is provided to pass a heat transfer fluid through the tubes to heat the fluid by removing heat from the combustion gases and entrained particulate materials passing through the outlet 48 to the conduit 50.

The assembly 46 provides for all of the above-mentioned advantages of the assembly 10 except that the assembly 46, due to the extra stiffness afforded by the plate 58 as compared to the belt 36, is not able to absorb movements as large as those absorbable by the assembly 10. However, the assembly 46 is excellent for pressurized applications since the assembly 46 is less likely to leak due to the plate 58.

It is understood that variations in the foregoing can be made within the scope of the invention. For example, the expansion seal assembly, although described as connecting a conduit to a furnace section, can be used to sealingly connect any two components or conduits of a fluidized bed reactor or of any other apparatus passing high temperature materials.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An expansion seal assembly for joining two conduits, comprising:
    means defining a passage extending between said conduits to allow the passage of material from one conduit to the other conduit and to permit relative movement between said conduits, said passage defining means including a plurality of hollow tubes for inhibiting flow of heat from said material;
    means attached to said passage defining means for sealingly connecting said conduits, said connecting means able to maintain said seal during said relative movement; and
    means disposed between said passage defining means and said connecting means for inhibiting flow of heat from said material.

2. The expansion seal assembly of claim 1 further comprising refractory covering the interior of said passage defining means to reduce erosion and thermal degradation of said assembly.

3. The expansion seal assembly of claim 1 wherein said passage defining means includes overlapping portions to permit said relative movement.

4. The expansion seal assembly of claim 1 wherein said inhibiting means comprises thermal insulation.

5. The expansion seal assembly of claim 1 wherein said inhibiting means comprises a ceramic blanket strip.

6. The expansion seal assembly of claim 1 wherein said connecting means comprises first and second plates extending outwardly from said conduits and a belt marginally sealed to said plates and dimensioned to permit said relative movement.

7. The expansion seal assembly of claim 6 wherein said belt is comprised of a composite fabric.

8. The expansion seal assembly of claim 6 wherein said inhibiting means abuts and extends between both of said plates during periods of said relative movement.

9. The expansion seal assembly of claim 6 wherein said plates comprise corrugations to permit said relative movement.

10. The expansion seal assembly of claim 1 wherein said connecting means comprises:
    a first plate extending outwardly from one conduit; and
    a second plate rigidly secured to the other conduit and extending between said other conduit and said first plate.

11. The expansion seal assembly of claim 10 wherein said second plate comprises corrugations to permit said relative movement.

12. An expansion seal assembly comprising:
    first and second conduits, a portion of said second conduit telescopically overlapping a portion of said first conduit in a spaced relationship to permit relative axial and lateral movements of said conduits, said conduits, including said portions thereof, comprising a plurality of hollow tubes;
    means for circulating a heat transfer fluid through said tubes to remove heat from within said conduits;
    first and second corrugated plates extending outwardly from said first and second conduits, respectively; and
    a composite fabric belt marginally sealed to said plates and dimensioned to permit said relative movements.

13. The expansion seal assembly of claim 12 further comprising multiple layers of thermal insulation disposed between the exterior of said conduits and said belt to inhibit heat flow, said layers including a ceramic blanket strip, a metallic shield, a pillow formed from an insulating ceramic blanket confined in a high temperature ceramic fiber glass cloth, and a soft packing formed of ceramic blanket strips.

14. The expansion seal assembly of claim 12 further comprising refractory covering the interior of said conduits to reduce erosion and thermal degradation of said assembly.

15. The expansion seal assembly of claim 12 further comprising:
    multiple layers of thermal insulation disposed between the exterior of said conduits and said belt to inhibit heat flow, said layers including a ceramic blanket strip, a metallic shield, a pillow formed from an insulating ceramic blanket confined in a high temperature ceramic fiber glass cloth, and a soft packing formed of ceramic blanket strips; and
    refractory covering the interior of said conduits to reduce erosion and thermal degradation of said assembly.

16. An expansion seal assembly, comprising:
    first and second conduits, a portion of said second conduit telescopically overlapping a portion of said first conduit in a spaced relationship to permit relative axial and lateral movements of said conduits, said conduits, including said portions thereof, comprising a plurality of hollow tubes;
    means for circulating a heat transfer fluid through said tubes to remove heat from within said conduits;
    a first plate extending outwardly from said second conduit; and
    a second plate rigidly secured to said first conduit and extending between said first conduit and said first plate, said second plate having corrugations to permit said relative movements.

17. The expansion seal assembly of claim 16 further comprising a layer of thermal insulation disposed between the exterior of said conduits and said plates to inhibit heat flow, said layer formed by a ceramic blanket strip.

18. The expansion seal assembly of claim 16 further comprising refractory covering the interior of said conduits to reduce erosion and thermal degradation of said assembly.

19. The expansion seal assembly of claim 16 further comprising:
    a layer of thermal insulation disposed between the exterior of said conduits and said plates to inhibit heat flow, said layer formed by a ceramic blanket strip; and
    refractory covering the interior of said conduits to reduce erosion and thermal degradation of said assembly.

20. An expansion seal assembly for joining two conduits, comprising:
    means defining a passage extending between said conduits to allow the passage of material from one conduit to the other conduit and to permit relative movement between said conduits, said passage defining means including means for removing heat released from said material;

means attached to said passage defining means for sealingly connecting said conduits, said connecting means able to maintain said seal during periods of said relative movement; and a plurality of layers of thermal insulation disposed between said passage defining means and said connecting means for inhibiting flow of heat from said material, said insulation including a ceramic blanket strip, a metallic shield, a pillow formed from an insulating ceramic blanket confined in a high temperature ceramic fiber glass cloth, and a soft packing formed of ceramic blanket strips.

* * * * *